United States Patent
Kou

(10) Patent No.: US 12,442,739 B2
(45) Date of Patent: Oct. 14, 2025

(54) DEVICE AND METHOD FOR EVALUATING THE SUSCEPTIBILITY OF HOT CRACKING IN ADDITIVE MANUFACTURING

(71) Applicant: Wisconsin Alumni Research Foundation, Madison, WI (US)

(72) Inventor: Sindo Kou, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 551 days.

(21) Appl. No.: 17/976,269

(22) Filed: Oct. 28, 2022

(65) Prior Publication Data

US 2024/0139811 A1 May 2, 2024

(51) Int. Cl.
| | | |
|---|---|---|
| *G01N 3/08* | (2006.01) | |
| *B29C 64/245* | (2017.01) | |
| *B29C 64/393* | (2017.01) | |
| *B33Y 10/00* | (2015.01) | |
| *B33Y 30/00* | (2015.01) | |
| *B33Y 50/02* | (2015.01) | |

(Continued)

(52) U.S. Cl.
CPC ............ *G01N 3/08* (2013.01); *B29C 64/245* (2017.08); *B29C 64/393* (2017.08); *B33Y 50/02* (2014.12); *B22F 10/25* (2021.01); *B22F 10/28* (2021.01); *B22F 12/30* (2021.01); *B23K 26/342* (2015.10); *B29C 64/153* (2017.08); *B33Y 10/00* (2014.12); *B33Y 30/00* (2014.12); *B33Y 40/00* (2014.12); *G01N 2203/0017* (2013.01); *G01N 2203/0057* (2013.01); *G01N 2203/0244* (2013.01); *G01N 2203/0282* (2013.01)

(58) Field of Classification Search
CPC ............ G01N 3/08; G01N 2203/0017; G01N 2203/0057; G01N 2203/0244; G01N 2203/0282; B29C 64/245; B29C 64/393; B29C 64/153; B33Y 50/02; B33Y 10/00; B33Y 30/00; B33Y 40/00; B22F 10/25; B22F 10/28; B22F 12/30; B23K 26/342
See application file for complete search history.

(56) References Cited

U.S. PATENT DOCUMENTS 11,660,818 B2 * 5/2023 Weaver ................. B29C 64/379
73/788

FOREIGN PATENT DOCUMENTS

| CN | 111272872 A | * | 6/2020 | ............. G01N 29/12 |
| CN | 112139656 A | * | 12/2020 | ............. B23K 20/26 |

OTHER PUBLICATIONS

CN-111272872-A, English Translation (Year: 2020).*
(Continued)

*Primary Examiner* — Ryan D Walsh
(74) *Attorney, Agent, or Firm* — Boyle Fredrickson, S.C.

(57) ABSTRACT

A device and method are provided for evaluating the susceptibility of hot cracking in an additive manufacturing process. A first end of a substrate is interconnected to a base and one of the base and a deposition device is moved in a first direction and the second end of the substrate is pulled. A powder is dispensed at a selected rate and an energy bean having an adjustable power density is direct at the powder to melt the powder to form a material which is deposited as a layer of a material on the substrate. During the deposition process or during the deposition of the material on a subsequent substrate, one or more parameters/conditions are varied to determine the point at which hot cracking occurs during the deposition process.

25 Claims, 6 Drawing Sheets

(51) Int. Cl.
- B22F 10/25 (2021.01)
- B22F 10/28 (2021.01)
- B22F 12/30 (2021.01)
- B23K 26/342 (2014.01)
- B29C 64/153 (2017.01)
- B33Y 40/00 (2020.01)

(56) References Cited

OTHER PUBLICATIONS

CN-112139656-A, English Translation (Year: 2020).*
K.A. Yushchenko et al., "Comparative evaluation of sensitivity of welded joints on alloy Inconel 690 to hot cracking," The Paton Welding Journal (Scientific and Technical), Nov. 2011 #11, pp. 2-7.
V.D. Poznyakov et al., "Influence of technological factors on resistance to delayed fracture of butt joints of rail steel in arc welding," The Paton Welding Journal (Scientific and Technical), Nov. 2011 #11, pp. 8-11.
V.S. Kuchuk-Yatsenko, "Flash-butt welding of high-temperature nickel alloy using nano-structured foils," The Paton Welding Journal (Scientific and Technical), Nov. 2011 #11, pp. 12-14.
V.N. Shlepakov et al., "Development of flux-cored wire for arc welding of high-strength steel of bainite class," The Paton Welding Journal (Scientific and Technical), Nov. 2011 #11, pp. 15-18.
Ya.P. Lazorenko et al., "Analysis of spectrum of the welding arc light for monitoring of arc welding (Review)," The Paton Welding Journal (Scientific and Technical), Nov. 2011 #11, pp. 19-21.
L.M. Lobanov et al., "In-process quality control of welded panels of alloy VT20 using method of electron shearography," The Paton Welding Journal (Scientific and Technical), Nov. 2011 #11, pp. 22-27.
N.M. Makhlin et al., "Single- and multioperator systems for automatic welding of position butt joints of nuclear power plant piping," The Paton Welding Journal (Industrial), Nov. 2011 #11, pp. 28-36.
I.I. Zaruba et al., "Ways of increasing the technological efficiency of rectifiers for mechanized welding and surfacing (Review)," The Paton Welding Journal (Industrial), Nov. 2011 #11, pp. 37-40.
O.K. Makovetskaya et al., "State-of-the-art and prospects of market of steel and welding equipment in China (Review)," The Paton Welding Journal (Industrial), Nov. 2011 #11, pp. 41-45.
V.A. Kolyada, "System of video observation of the process of TIG welding of titanium structures," The Paton Welding Journal (Brief Information), Nov. 2011 #11, pp. 46-48.

* cited by examiner

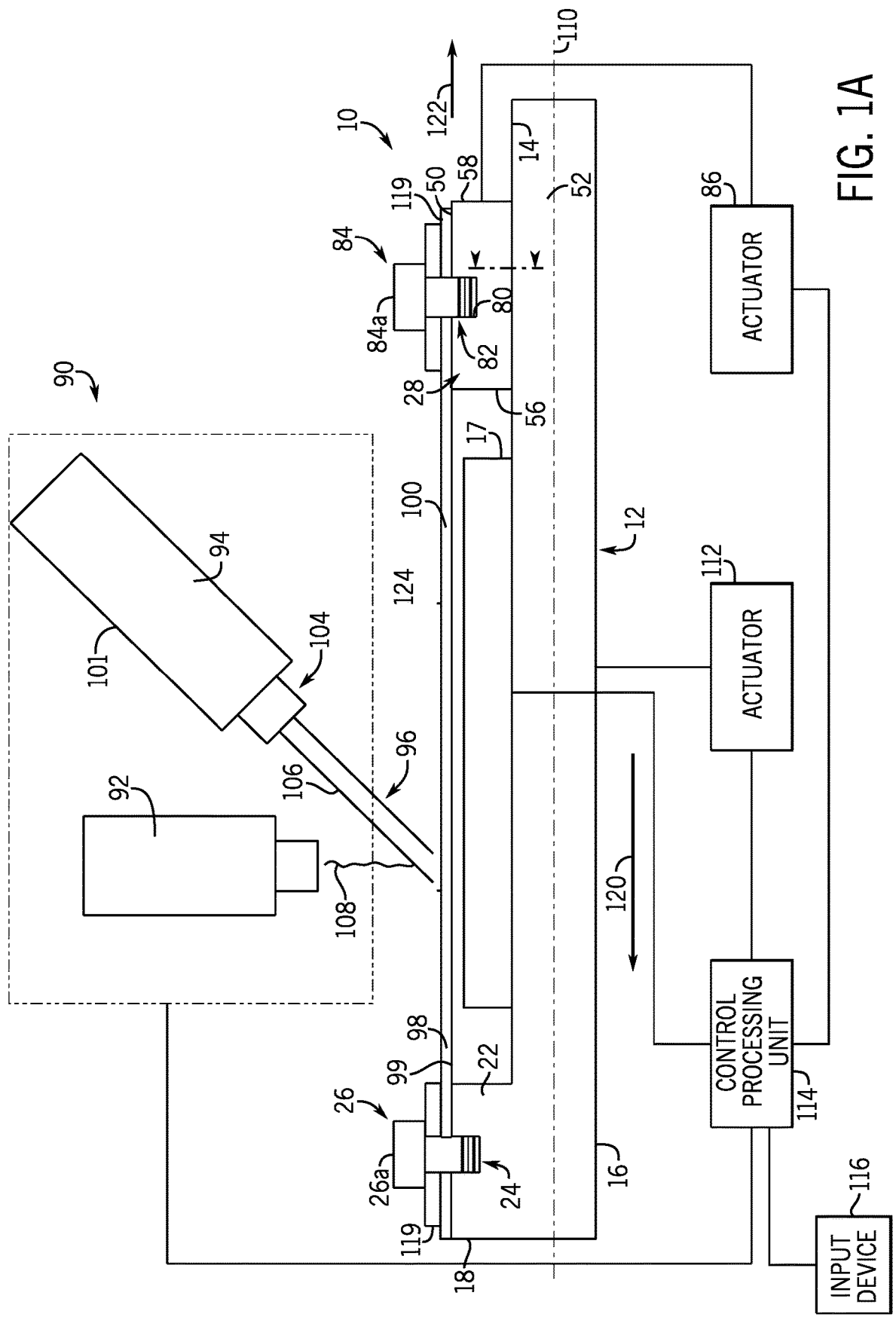

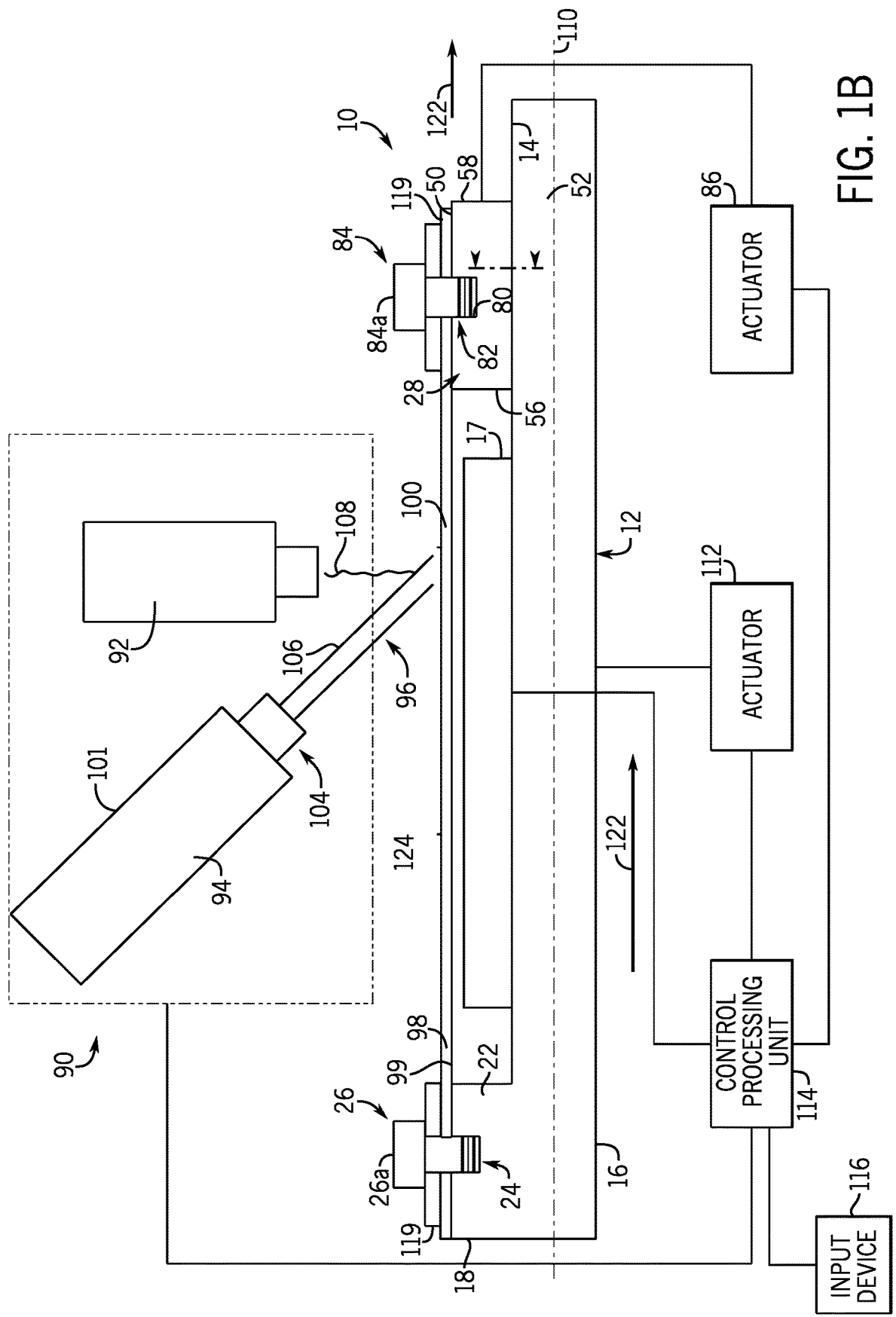

DEVICE AND METHOD FOR EVALUATING THE SUSCEPTIBILITY OF HOT CRACKING IN ADDITIVE MANUFACTURING

REFERENCE TO GOVERNMENT GRANT

This invention was made with government support under 1904503 awarded by the National Science Foundation. The government has certain rights in the invention.

FIELD OF THE INVENTION

This invention relates generally to additive manufacturing, and in particular, to a device and method for evaluating the susceptibility of hot cracking in an additive manufacturing process.

BACKGROUND AND SUMMARY OF THE INVENTION

Additive manufacturing is a process whereby a three-dimensional object is created by depositing successive layers of a melted or partially-melted material onto each other to "build" the object. Each layer bonds to a preceding layer of the melted or partially-melted material as the melted or partially-melted material cures, thereby fusing the layers together to form the three-dimensional object.

As is known, hot cracking can occur in the portion of the object wherein the layers fuse together. Hot cracking which occurs in the "fusion zones" are typically referred to as solidification cracking. In addition, hot cracking can also occur in the partially melted zone (PMZ) of the object immediately next to the fusion zone. This type of hot cracking is typically referred to as liquation cracking and can degrade the mechanical properties of the object significantly.

It can be appreciated that most hot cracks are located inside the three-dimensional object formed and are not visible from outside the object. Hence, in order to determine if hot cracking is occurring during the additive manufacturing process, samples of the manufactured, three-dimensional objects must be tested. Typically, these samples are cut, polished and etched at multiple locations to determine if hot cracking is present therein. Unfortunately, hot cracks are typically small and difficult to open up for examining the fracture surfaces to confirm the type of hot cracking or to further analyze the type of cracking. As a result, a determination as to the susceptibility to hot cracking of an additive manufacturing process is often based upon the total number of the cracks found or the total length of the cracks found. Naturally, since hot cracks tend to be small, many of the cracks can be missed or go undetected. As such, it has become highly desirable to provide a standardized device and method for evaluating the susceptibility of hot cracking in an additive manufacturing process.

Therefore, it is primary object and feature of the present invention to provide a device and method for evaluating the susceptibility of hot cracking in an additive manufacturing process.

It is a further object and feature of the present invention to provide a method for evaluating the susceptibility of hot cracking in an additive manufacturing process which is consistent and repeatable with respect to alternate additive manufacturing processes.

It is a further object and feature of the present invention to provide a method for evaluating the susceptibility of hot cracking in an additive manufacturing process which is simple and inexpensive.

In accordance with the present invention, a device is provided for evaluating the susceptibility of hot cracking in an additive manufacturing process. The device includes a deposition device configured to deposit a layer of a material on a substrate. A base is provided in spaced relation to the deposition device and is configured to support the substrate. A first connection arrangement is connectable to the base and adapted for interconnecting to a first end of the substrate to the base. A second connection arrangement is slidably supported on the base and is connectable to a second end of the substrate. A drive mechanism is operatively connected to one of the base and the deposition device and is configured to axially move the one of the base and the deposition device in a first direction at a speed as the layer of material is being deposited on the substrate. A puller mechanism is operatively connected to the second connection arrangement. The puller mechanism pulls the second connection arrangement away from the first connection arrangement. The second connection arrangement may be pulled away from the first connection arrangement in a second direction, which may be opposite to the first direction or the same as the first direction.

The first connection arrangement includes a pin threadable into the base at a first location. The pin is configured to pass through a corresponding first aperture in the first end of the substrate and into the base to interconnect the substrate to the base. The second connection arrangement includes a slider configured for slidable linear movement along the base and a pin threadable into the slider. The pin configured to pass through a corresponding aperture in a second end of the substrate and into the slider to interconnect the substrate to the slider.

A central processing unit may be operatively connected to the drive mechanism. The central processing unit may be configured to control the speed of the one of the base and the deposition device in the first direction. In addition, the central processing unit may be operatively connected to the puller mechanism and configured to control a speed at which the second connection arrangement is pulled away from the first connection arrangement in a second direction or a force at which the second connection arrangement is pulled away from the first connection arrangement in a second direction. It is intended for the speed at which the drive mechanism axially moves the one of the base and the deposition device in the first direction to be adjustable. The puller mechanism pulls the second connection arrangement in the second direction at a selected speed or at a selected force, which are also adjustable.

The deposition device may include a dispenser configured to dispense a powder a selected rate. An energy beam generator is configured to generate an energy beam having an adjustable power density. The energy beam is directable at the powder to melt the powder and form the material.

In accordance with a further aspect of the present invention, a method is provided for evaluating the susceptibility of hot cracking in an additive manufacturing process. The method includes the steps of interconnecting a first end of a substrate to a base and moving one of the base and a deposition device in a first direction. A layer of a material is deposited on the substrate with the deposition device. A second end of the substrate is pulled in a second direction, which may be opposite to the first direction or the same the first direction.

The method may include the steps of evaluating the layer of material deposited on the substrate and heating the substrate prior to the step of depositing the layer of material on the substrate. The deposition device includes a dispenser configured to dispense a powder a selected rate. The powder has a particle size. An energy beam generator is configured to generate an energy beam having an adjustable power density and is directable at the powder to melt the powder and form the material.

The substrate may be a first substrate and the one of the base and the deposition device is moved in the first direction at a speed. The second end of the substrate is pulled in the second direction with a force. After the layer of material is deposited on the first substrate, it is contemplated to disconnect the first end of the first substrate from the base and interconnect a first end of a second substrate to the base. At least one of the base and a deposition device is moved in the first direction and a layer of the material is deposited on the second substrate. A second end of the second substrate is pulled in the second direction, opposite to the first direction. At least one of the speed at which the one of the base and the deposition device is moved, the force with which the second end of the substrate in pulled in the second direction, the selected rate at which the powder is dispensed, the particle size of the powder, and the power density of the energy beam, is varied. The layer of material deposited on the second substrate may be evaluated for hot cracks. In addition, the layers of material deposited on the first and second of substrates may be compared and a preferable additive manufacturing process may be determined in response to the comparison of the layers of material deposited on the first and second substrates.

In accordance with a still further aspect of the present invention, a method is provided for evaluating the susceptibility of hot cracking in an additive manufacturing process. The method includes the step of providing a plurality of substrates. For each substrate, a first end of the substrate is interconnected to a base and one of the base and a deposition device is moved in a first direction at a speed. A powder is dispensed at a selected rate and an energy beam having an adjustable power density is generated. The energy beam is direct at the powder to melt the powder and form a material. A layer of the material is deposited on the substrate and a second end of the substrate is pulled in a second direction, in a second direction, which may be opposite to the first direction or the same the first direction.

The method contemplates evaluating the layers of material deposited on each of the substrates and heating the substrate prior to the step of depositing the layer of material on the substrate. At least one of the speed at which the at least one of the base and the deposition device is moved, the force with which the second end of the substrate in pulled in the second direction, the selected rate at which the powder is dispensed, a particle size of the powder, and the power density of the energy beam, is varied for each of the plurality of substrates. The layers of material deposited on the plurality of substrates are compared and a preferable additive manufacturing process is determined in response to the comparison of the layers of material deposited on the plurality of substrates.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings:

FIG. 1A is a schematic view of a device for evaluating the susceptibility of hot cracking in an additive manufacturing process in accordance with the present invention;

FIG. 1B is a schematic view of an alternate arrangement for evaluating the susceptibility of hotcracking in an additive manufacturing process in accordance with the present invention;

DETAILED DESCRIPTION OF THE DRAWINGS

Figure 2:
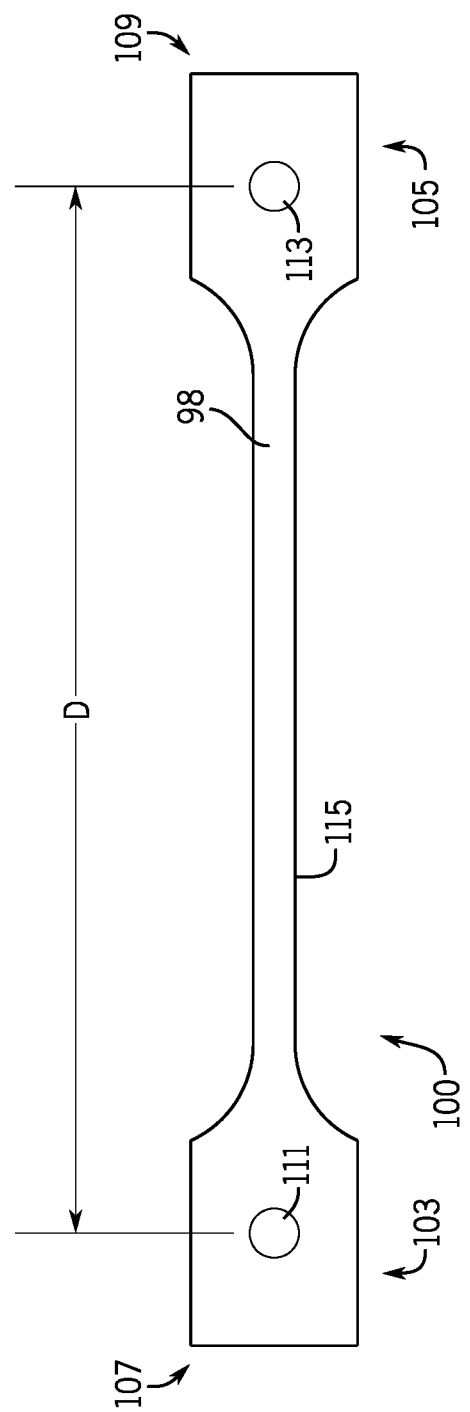
FIG. 2 is a top plan view of a test strip for use with the device of FIG. 1A.

Referring to FIG. 1A, a device for evaluating the susceptibility of hot cracking in an additive manufacturing process is generally designated by the reference numeral 10. Device 10 includes base 12 having an upper surface 14 and a lower surface 16. It is contemplated to operatively connect heater 17 to upper surface 14 of base 12, for reasons hereinafter described. Mounting platform 18 projects from upper surface 14 of base 12 and terminates at a generally planar mounting surface 20. Threaded aperture 22 extends into mounting surface 20 along an axis generally perpendicular thereto. Threaded aperture 22 is configured to threadably receive threaded shaft 24 of bolt 26, as hereinafter described.

Figure 3:
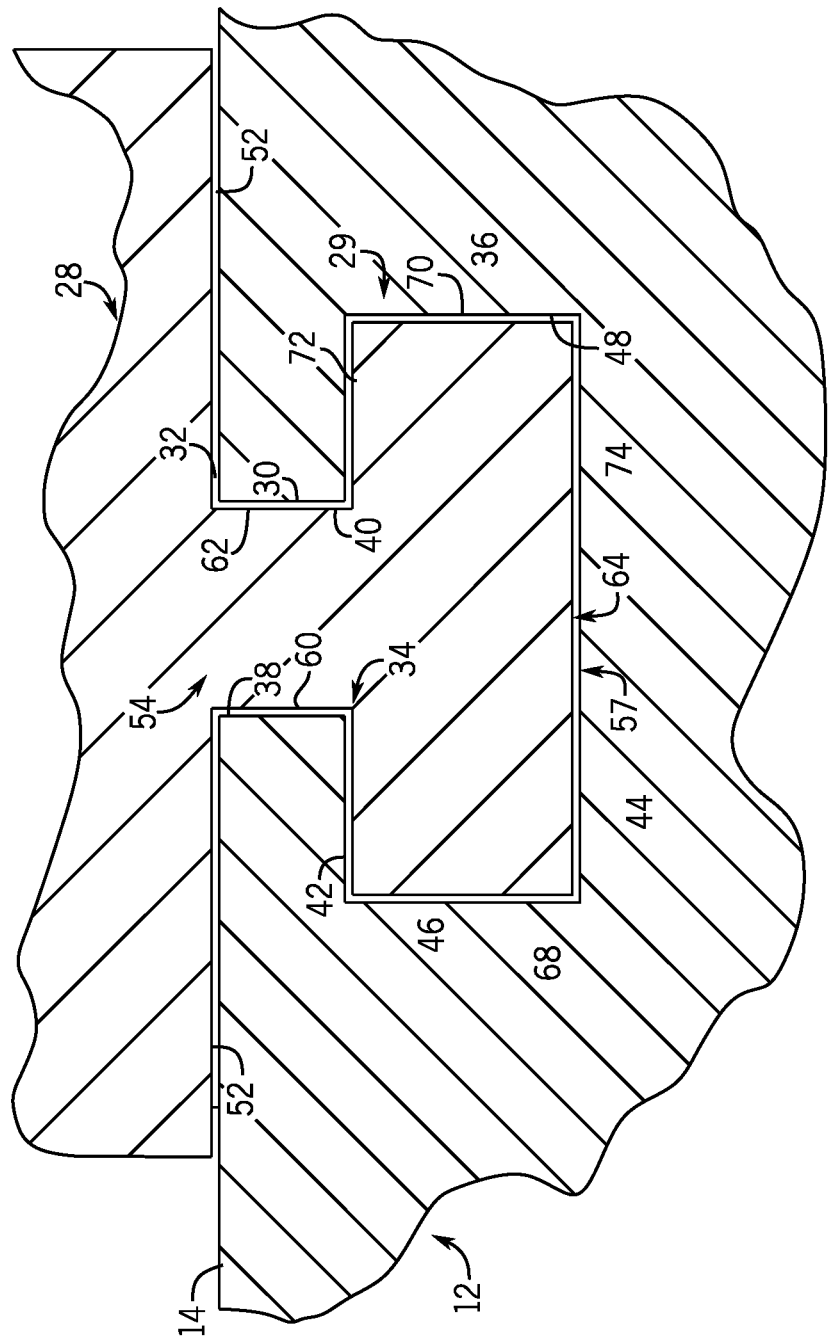
FIG. 3 is a cross-sectional view of the device of the present invention take along line 3-3 of FIG. 1A.

Device 10 further includes a slider or motion stage 28 slidably received on upper surface 14 of base 12. In order to facilitate slidable movement of motion stage 28 along upper surface 14 of base 12, guide 29 is provided, FIGS. 1 and 3. By way of example, guide 29 includes slot 30 formed in base 12. Slot 30 includes a first end 32 communicating with upper surface 14 of base 12 and a second end 34 communicating with channel 36 within the interior of base 12. Slot 30 is defined by first and second generally parallel sidewalls 38 and 40, respectively, which lie in planes generally perpendicular to upper surface 14 of base 12. In the depicted embodiment, channel 36 have a generally rectangular cross-section and is defined by spaced, generally parallel upper and lower walls 42 and 44, respectively, interconnected by spaced, generally parallel sidewalls 46 and 48, respectively. Upper and lower walls 42 and 44, respectively, are generally parallel to upper surface 14 of base 12 and sidewalls 46 and 48, respectively, are generally perpendicular to upper surface 14 of base 12.

Motion stage 28 is generally rectangular is shape and includes an upper surface 50 generally co-planar with mounting surface 20 of mounting platform 18, for reasons hereinafter described, and a lower surface 52 which forms a slidable interface with upper surface 14 of base 12. Guide member 57 depends from lower surface 52 and includes neck 54 extending between first and second ends 56 and 58, respectively, of motion stage 28. Neck 54 is defined by first and second sidewalls 60 and 62, respectively, which form slidable interfaces with corresponding sidewalls 38 and 40, respectively, defining slot 30. Guide member 57 further includes enlarged head 64 depending from neck 54.

Head 64 has a generally square cross-sectional shape corresponding in size and shape to channel 36 in base 12.

More specifically, head 64 is defined by first and second sidewalls 68 and 70, respectively, which form slidable interfaces with corresponding sidewalls 46 and 48, respectively, and upper and lower walls 72 and 74, respectively, which form a slidable interface with upper and lower walls 42 and 44, respectively. As described, channel 36 and slot 30 are configured to support or maintain head 64 of guide member 57 adjacent to slot 30, while neck 54 extends through slot 30. Neck 54 terminates on a plane generally co-planar with upper surface 14 of base 12 such that lower surface 52 of motion stage 28 is slidable on upper surface 14 of base 12. The configuration of channel 36 and slot 30 allow for guide member 57, and hence, motion stage 28 to slide move along a length of base 12, as hereinafter described. It can be appreciated that the guide 29 and guide member 57 arrangement heretofore described is merely illustrative and that other arrangements to facilitate the axially sliding of motion stage 28 along upper surface 14 of base 12 are possible without deviating from the scope of the present invention.

Motion stage 28 further includes threaded aperture 80 extends into upper surface 50 along an axis generally perpendicular thereto. Threaded aperture 80 in upper surface 50 of motion stage 28 extend through a common axis with threaded aperture 22 in mounting surface 20 of mounting platform 18 and is configured to threadably receive threaded shaft 82 of bolt 84 in a mating relationship, as hereinafter after described. Second end 58 of motion stage 28 is operatively connected to actuator 86, e.g. a servo motor or the like. Actuator 86 is configured to selectively move motion stage 28 toward and away from mounting platform 18 with a selected force or at a selected velocity, for reasons hereinafter described.

Device 10 further includes a direct energy deposition apparatus, generally designated by the reference numeral 90. Apparatus 90 includes directed energy source 92, e.g., a laser or an electron beam generator, for generating energy beam 108 and material supply structure 94 for directing a flow of material, generally designed by the reference numeral 96, toward upper surface 98 of a substrate, e.g., test strip 100, as hereinafter described. Material supply structure 94 includes nozzle 104 operatively connected to material source 101, such as a hopper or a bin. It is intended for nozzle 104 to receive material 106 from material source 101 and direct flow of material 96 toward upper surface 98 of test strip 100 at a selected volume and velocity. It is contemplated to mount nozzle 104 on a multi axis arm (not shown) to allow nozzle 104 to move in multiple directions to more accurately to align the flow of material 96 toward upper surface 98 of test strip 100. It is intended for direct energy source 92 to direct energy beam 108 having a selected intensity at flow of material 96 to melt material 106 in flow of material 96 such that the melted material 106 is deposited on test strip 100, as hereinafter described.

Alternatively, it is contemplated to provide a groove (not shown) along upper surface 98 of test strip 100. In such an arrangement, nozzle 104 receives material 106 from material source 101 and directs the flow of material 96 into the groove on upper surface 98 of test strip 100 so as to fill the groove. Direct energy source 92 may then direct energy beam 108, having a selected intensity, at material 106 in the groove in the upper surface 98 of test strip 100 so as to melt material 106 therein such that melted material 106 forms layer 124 of material 106 on test strip 100. In such arrangement, it can be appreciated that energy beam 108 may be movable along upper surface 98 of test strip 100 to melt material 106.

Referring to FIGS. 1-2, test strip 100 is generally flat and includes a first upper surface 98 and a second lower surface 99. Enlarged mounting portions 103 and 105 are provided at corresponding first and second ends 107 and 109, respectively, of test strip 100 and are interconnected to each other by central portion 115. Enlarged mounting portions 103 and 105 at first and second ends 107 and 109, respectively, of test strip 100 include corresponding apertures 111 and 113, respectively, therethrough, which are configured to allow shafts 24 and 82 of bolts 26 and 84, respectively, to pass therethrough. Apertures 111 and 113 through enlarged mounting portions 103 and 105, respectively, of test strip 100 are spaced by a distance D to facilitate the mounting of test strip 100 to base 12, as hereinafter described.

Referring back to FIG. 1A, it contemplated for at least one of apparatus 90 (or alternatively, energy beam 108) and base 12 to be movable along a corresponding axis. In the depicted embodiment, base 12 is hereinafter described as being movable along axis 110. However, it can be understood that apparatus 90 or energy beam 108 may be movable along a corresponding axis instead of base 12 or in addition to base 12 without deviating from the scope of the present invention. Base 12 is operatively connected to actuator 112, e.g. a servo motor. Actuator 112 is configured to selectively move base 12 along axis 110 at a selected velocity, for reasons hereinafter described.

Actuators 86 and 112, heater 17, as well as, apparatus 90 are operatively connected to central processing unit 114 configured to control the operation thereof. More specifically, central processing unit 114 controls the velocity and the direction which actuator 112 moves base 12 along axis 110. Input device 116 may be provided to allow a user to selectively input the velocity and the direction which actuator 112 moves base 12 along axis 110. Alternatively, the velocity and the direction which actuator 112 moves base 12 along axis 110 may be preprogrammed into central processing unit 114. Similarly, central processing unit 114 controls the velocity, the direction and/or the force which actuator 86 selectively moves motion stage 28 toward and away from mounting platform 18. A user may selectively input to central processing unit 114, via input device 116, the velocity, the direction and/or the force which actuator 86 selectively moves motion stage 28 toward and away from mounting platform 18. Alternatively, one or more of the velocity, the direction and/or the force which actuator 86 moves motion stage 28 toward and away from mounting platform 18 may be preprogrammed into central processing unit 114.

Central processing unit 114 also controls the intensity of energy beam 108 produced by energy source 92, the position of nozzle 104, and the volume and velocity of material 106 in flow of material 96 flowing from nozzle 104. A user may selectively input to central processing unit 114, via input device 116, a desired intensity of the energy beam 108, the position of nozzle 104, and the volume and velocity of material 106 in flow of material 96 flowing from nozzle 104. Alternatively, one or all of the intensity of the energy beam 108, the position of nozzle 104, and the volume and velocity of material 106 in flow of material 96 flowing from nozzle 104 may be preprogrammed into central processing unit 114.

It is further contemplated for central processing unit 114 to control operation of heater 17. It is intended for heater 17 to heat test strip 100 to a selected temperature. A user may selectively input to central processing unit 114, via input device 116, the selected temperature, or alternatively, the selected temperature may be preprogrammed into central processing unit 114.

Figure 4:
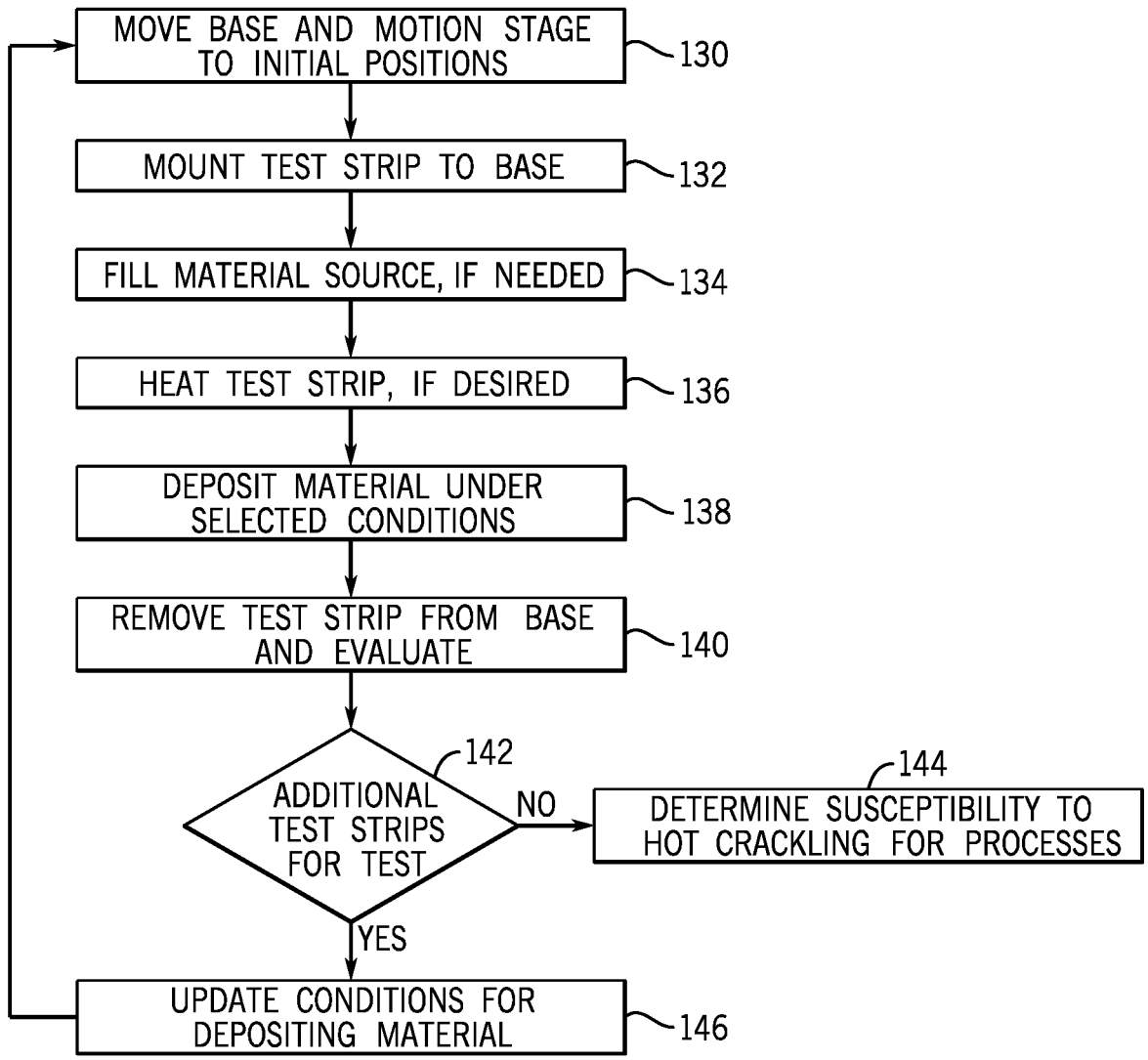
FIG. 4 is a flowchart showing a method for evaluating the susceptibility of hot cracking in an additive manufacturing process in accordance with the present invention.

In order to evaluate the susceptibility of hot cracking in an additive manufacturing process, a layer of melted material 106 is deposited on a series of test strips 100 under various predetermined, repeatable, varying conditions such that the series of test strips 100 may be examined thereafter to determine the superior methodology. In order to deposit a layer of melted material 106 on an initial of test strip 100, actuator 112 moves base 12 to an initial position, FIG. 1A, and actuator 86 moves motion stage 28 to an initial position wherein threaded aperture 80 in upper surface 50 of motion stage 28 is spaced from threaded aperture 22 in mounting surface 20 of mounting platform 18 by distance D, FIG. 4, block 130. Thereafter, test strip 100 is mounted to base 12, block 132. More specifically, enlarged mounting portions 103 and 105 of test strip 100 are positioned on mounting surface 20 of mounting platform 18 and upper surface 50 of motion stage 28, respectively, such that: 1) aperture 111 through enlarged portion 103 of test strip 100 overlaps and is axially aligned with threaded aperture 22 in mounting surface 20 of mounting platform 18; and 2) aperture 113 through enlarged portion 105 of test strip 100 overlaps and is axially aligned with threaded aperture 80 in upper surface 50 of motion stage 28. Shafts 24 and 82 of bolts 26 and 84, respectively, are inserted through apertures 111 and 113, respectively, and threaded into threaded apertures 22 and 80, respectively, so as to capture: 1) enlarged portion 103 of test strip 100 between head 26a of bolt 26 and mounting surface 20 of mounting platform 18; and 2) enlarged portion 105 of test strip 100 between head 84a of bolt 84 and upper surface 50 of motion stage 28, thereby connecting test strip 100 to base 12. Washers 119 and 121 may be positioned between head 26a of bolt 26 and mounting surface 20 of mounting platform 18 and between head 84a of bolt 84 and upper surface 50 of motion stage 28, respectively, to prevent bolts 26 and 84 from loosening.

If needed, material source 101 is filled with material 106, e.g. spherical gas-atomized Al powder, block 134. Thereafter, optionally, under the control of central processing unit 114, heater 17 heats test strip 100 to a selected temperature, block 136. Once test strip 100 reaches a desired temperature (whether ambient temperature or a heated, elevated temperature), the process for depositing material 106 on test strip 100.

Initially, in order to deposit melted material 106 on test strip 100, block 138, material 106 is ejected from nozzle 104 under the control of central processing unit 114 to form flow of material 106 directed at upper surface 98 of test strip 100 adjacent to enlarged mounting portion 103 on central portion 115. The volume and velocity of material 106 in flow of material 96 flowing from nozzle 104 is set to an initial volume and velocity by central processing unit 114. Simultaneously, under the control of central processing unit 114, direct energy source 92 directs energy beam 108 having a selected initial intensity at the flow of material 96 to melt material 106 in the flow of material 96 such that melted material 106 is engages and is deposited on upper surface 98 of test strip 100 adjacent to enlarged mounting portion 103 on central portion 115 on test strip 100.

As material 106 is ejected from nozzle 104 under the control of central processing unit 114, actuator 112, under the control of central processing unit 114, axially moves base 12 in a first direction, designated by the reference numeral 120, at an initial velocity. In addition, actuator 86, under the control of central processing unit 114, axially moves motion stage 28 from mounting platform 18 in a second direction, generally designated by the reference numeral 122 and opposite to first direction 120, with an initial force or at an initially velocity. With base 12 traveling in first direction 120, a layer 124 of melted material 106 is deposited on upper surface 98 of test strip 100 from adjacent to enlarged mounting portion 103 on central portion 115 of test strip 100 to adjacent to enlarged mounting portion 105 on central portion 115 of test strip 100.

Once layer 124 is deposited central portion 115 of test strip, central processing unit 114 terminates operation of actuators 86 and 112, apparatus 90 and heater 17. Shafts 24 and 82 of bolts 26 and 84, respectively, are unthreaded from corresponding threaded apertures 22 and 80 in mounting surface 20 of mounting platform 18 and upper surface 50 of motion stage 28, respectively, and removed from apertures 111 and 113 through corresponding enlarged portions 103 and 105, respectively, of test strip 100 so as to disconnect test strip 100 from base 12. Thereafter, test strip 100 may be removed from base 12 and evaluated for hot cracks and crack susceptibility, for example, by scanning electron microscopy, block 140.

Once the initial test strip 100 is removed from base 12, base 12 is returned to the initial position and the process is repeated for a selected number of test strips 100 under different test conditions, block 142. For example, for each subsequent test strip 100, one or more of the following parameters/conditions may be varied by central processing unit 114, block 144:

1) the temperature of test strip 100;
2) the volume of material 106 in the flow of material 96 flowing from nozzle 104;
3) the velocity of material 106 flowing from nozzle 104;
4) the intensity of energy beam 108 generated by energy source 92;
5) the velocity of base 12 axially moving in first direction 120;
6) the velocity of motion stage 28 moving in second direction 122; and/or
7) the force with which actuator 86 pulls motion stage 28 in second direction 122.

By way of example, if no cracking is observed in layer 124 deposited on the initial test strip 100, the velocity of motion stage 28 moving in second direction 122 can be increased when depositing layer 124 on a subsequent test strip 100. The velocity of motion stage 28 moving in second direction 122 can be increased for each subsequent test until hot cracking is observed in layer 124 of test strip 100. This velocity can be taken as the critical deformation velocity. It can be understood that the lower the critical deformation velocity is, the higher the susceptibility of hot cracking occurring during the additive manufacturing process. Thus, the critical deformation velocity may be used as a measure for determining the susceptibility of hot cracking occurring during the additive manufacturing process, block 146.

Upon completion of the deposition of layer 124 of material 106 on the selected number of test strips 100, each under unique test conditions, the selected number of test strips 100 may be evaluated and compared to each other to determine the conditions corresponding to an optimum additive manufacturing process for fabricating an item from a desired material onto a substrate.

Figure 5:
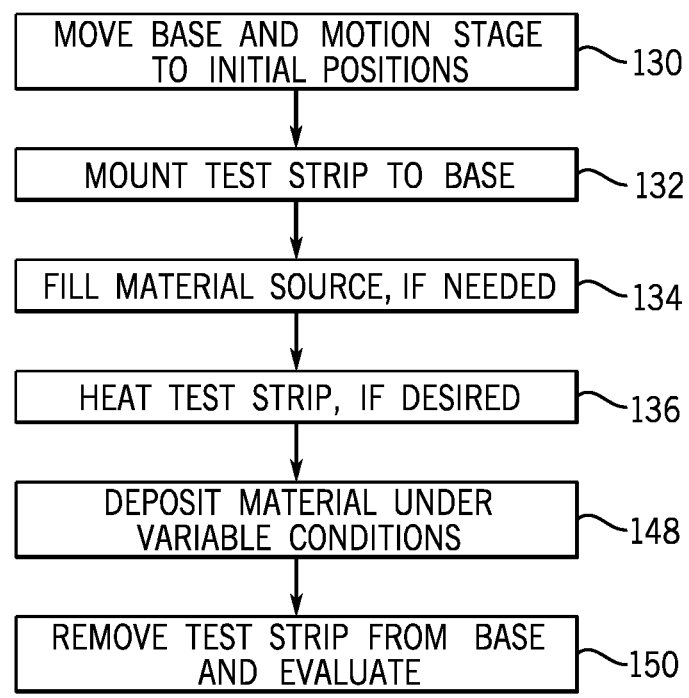
FIG. 5 is a flowchart, similar to FIG. 4, showing a variation of the method for evaluating the susceptibility of hot cracking in an additive manufacturing process in accordance with the present invention.

Referring to FIG. 5, in an alternate methodology, blocks 130, 132, 134 and 136 are repeated. However, it is contemplated for one or more of the following Parameters/conditions to be varied by central processing unit 114 as melted material 106 is deposited on the initial test strip 100, block 148:

1) the temperature of test strip 100;
2) the volume of material 106 in the flow of material 96 flowing from nozzle 104;
3) the velocity of material 106 flowing from nozzle 104;
4) the intensity of energy beam 108 generated by energy source 92;
5) the velocity of base 12 axially moving in first direction 120;
6) the velocity of motion stage 28 moving in second direction 122; and/or
7) the force with which actuator 86 pulls motion stage 28 in second direction 122.

For example, the velocity of motion stage 28 moving in second direction 122 can initially be set to zero and increased linearly over time. The distance between the appearance of the first crack and the start of deposition of layer 124 of material 106 adjacent to enlarged mounting portion 103 on central portion 115 of test strip 100 can be measured after deposition. Since the velocity of base 12 axially moving in first direction 120 is constant, the critical deformation velocity at which motion stage 28 is moving in second direction 122 when the first crack appears can be determined. As noted above, the lower the critical deformation velocity is, the higher the susceptibility of hot cracking occurring during the additive manufacturing process. Thus, the critical deformation velocity may be used as a measure for determining the susceptibility of hot cracking occurring during the additive manufacturing process, block 150.

Referring to FIG. 1B, in an alternate arrangement, blocks 130, 132, 134 and 136 are repeated. However, in order to deposit melted material 106 on test strip 100, block 138, material 106 ejected from nozzle 104 under the control of central processing unit 114 to form flow of material 106 is directed at upper surface 98 of test strip 100 adjacent to enlarged mounting portion 105 onto central portion 115. The volume and velocity of material 106 in flow of material 96 flowing from nozzle 104 is set to an initial volume and velocity by central processing unit 114. Simultaneously, under the control of central processing unit 114, direct energy source 92 directs energy beam 108 having a selected initial intensity at the flow of material 96 to melt material 106 in the flow of material 96 such that melted material 106 is engages and is deposited on upper surface 98 of test strip 100 adjacent to enlarged mounting portion 105 on central portion 115 on test strip 100.

As material 106 is ejected from nozzle 104 under the control of central processing unit 114, actuator 112, under the control of central processing unit 114, axially moves base 12 in second direction 122 at an initial velocity. In addition, actuator 86, under the control of central processing unit 114, axially moves motion stage 28 from mounting platform 18 also in second direction 122 with an initial force or at an initially velocity of sufficient magnitude to overcome the axially movement of base 12 such that motion stage 28 is moving faster than base 12 in the second direction. With base 12 traveling in second direction 122, layer 124 of melted material 106 is deposited on upper surface 98 of test strip 100 from adjacent to enlarged mounting portion 105 on central portion 115 of test strip 100 to adjacent to enlarged mounting portion 103 on central portion 115 of test strip 100.

Once layer 124 is deposited central portion 115 of test strip, central processing unit 114 terminates operation of actuators 86 and 112, apparatus 90 and heater 17. Shafts 24 and 82 of bolts 26 and 84, respectively, are unthreaded from corresponding threaded apertures 22 and 80 in mounting surface 20 of mounting platform 18 and upper surface 50 of motion stage 28, respectively, and removed from apertures 111 and 113 through corresponding enlarged portions 103 and 105, respectively, of test strip 100 so as to disconnect test strip 100 from base 12. Thereafter, test strip 100 may be removed from base 12 and evaluated for hot cracks and crack susceptibility, for example, by scanning electron microscopy, block 140.

Once the initial test strip 100 is removed from base 12, base 12 is returned to the initial position and the process is repeated for a selected number of test strips 100 under different test conditions, block 142. For example, for each subsequent test strip 100, one or more of the following parameters/conditions may be varied by central processing unit 114, block 144:
1) the temperature of test strip 100;
2) the volume of material 106 in the flow of material 96 flowing from nozzle 104;
3) the velocity of material 106 flowing from nozzle 104;
4) the intensity of energy beam 108 generated by energy source 92;
5) the velocity of base 12 axially moving in second direction 120;
6) the velocity of motion stage 28 moving in second direction 122; and/or
7) the force with which actuator 86 pulls motion stage 28 in second direction 122.

By way of example, if no cracking is observed in layer 124 deposited on the initial test strip 100, the velocity of motion stage 28 moving in second direction 122 can be increased when depositing layer 124 on a subsequent test strip 100. The velocity of motion stage 28 moving in second direction 122 can be increased for each subsequent test until hot cracking is observed in layer 124 of test strip 100. This velocity can be taken as the critical deformation velocity. It can be understood that the lower the critical deformation velocity is, the higher the susceptibility of hot cracking occurring during the additive manufacturing process. Thus, the critical deformation velocity may be used as a measure for determining the susceptibility of hot cracking occurring during the additive manufacturing process, block 146.

Upon completion of the deposition of layer 124 of material 106 on the selected number of test strips 100, each under unique test conditions, the selected number of test strips 100 may be evaluated and compared to each other to determine the conditions corresponding to an optimum additive manufacturing process for fabricating an item from a desired material onto a substrate.

Alternatively, as noted above with respect to FIG. 5, after repeating blocks 130, 132, 134 and 136, the following parameters/conditions may be varied by central processing unit 114 as melted material 106 is deposited on the initial test strip 100, block 148:
1) the temperature of test strip 100;
2) the volume of material 106 in the flow of material 96 flowing from nozzle 104;
3) the velocity of material 106 flowing from nozzle 104;
4) the intensity of energy beam 108 generated by energy source 92;
5) the velocity of base 12 axially moving in second direction 122;
6) the velocity of motion stage 28 moving in second direction 122; and/or
7) the force with which actuator 86 pulls motion stage 28 in second direction 122.

For example, the velocity of motion stage 28 moving in second direction 122 can initially be set to zero and increased linearly over time. The distance between the appearance of the first crack and the start of deposition of layer 124 of material 106 adjacent to enlarged mounting portion 105 on central portion 115 of test strip 100 can be measured after deposition. Since the velocity of base 12 axially moving in second direction 122 is constant, the critical deformation velocity at which motion stage 28 is moving in second direction 122 when the first crack appears can be determined. As noted above, the lower the critical deformation velocity is, the higher the susceptibility of hot cracking occurring during the additive manufacturing process. Thus, the critical deformation velocity may be used as a measure for determining the susceptibility of hot cracking occurring during the additive manufacturing process, block 150.

It can be appreciated that various modes of carrying out the invention are contemplated as being within the scope of the following claims particularly pointing out and distinctly claiming the subject matter, which is regarded as the invention.

I claim:

1. A device for evaluating the susceptibility of hot cracking in an additive manufacturing process, comprising:
 a deposition device configured to deposit a layer of a material on a substrate;
 a base in spaced relation to the deposition device and being configured to support the substrate;
 a first connection arrangement connectable to the base and adapted for interconnecting to a first end of the substrate to the base;
 a second connection arrangement slidably supported on the base and being connectable to a second end of the substrate;
 a drive mechanism operatively connected to one of the base and the deposition device and being configured to axially move the one of the base and the deposition device in a selected direction at a speed as the layer of material is being deposited on the substrate; and
 a puller mechanism operatively connected to the second connection arrangement, the puller mechanism pulling the second connection arrangement away from the first connection arrangement.

2. The device of claim 1 wherein the first connection arrangement includes a pin threadable into the base at a first location, the pin configured to pass through a corresponding first aperture in the first end of the substrate and into the base to interconnect the substrate to the base.

3. The device of claim 1 wherein the second connection arrangement includes:
 a slider configured for slidable linear movement along the base; and
 a pin threadable into the slider, the pin configured to pass through a corresponding aperture in a second end of the substrate and into the slider to interconnect the substrate to the slider.

4. The device of claim 1 further comprising a central processing unit operatively connected to the drive mechanism, the central processing unit configured to control the speed of the one of the base and the deposition device in the selected direction.

5. The device of claim 1 further comprising a central processing unit operatively connected to the puller mechanism, the central processing unit configured to control a speed at which the second connection arrangement is pulled away from the first connection arrangement.

6. The device of claim 1 further comprising a central processing unit operatively connected to the puller mechanism, the central processing unit configured to control a force at which the second connection arrangement is pulled away from the first connection arrangement.

7. The device of claim 1 wherein the speed at which the drive mechanism axially moves the one of the base and the deposition device in the selected direction is adjustable.

8. The device of claim 1 wherein the puller mechanism pulls the second connection arrangement at a selected speed, the selected speed being adjustable.

9. The device of claim 1 wherein the puller pulls the second connection arrangement with a selected force, the selected force being adjustable.

10. The device of claim 1 wherein the deposition device includes:
 a dispenser configured to dispense a powder at a selected rate; and
 an energy beam generator configured to generate an energy beam having an adjustable power density, the energy beam being directable at the powder to melt the powder and form the material.

11. A method for evaluating the susceptibility of hot cracking in an additive manufacturing process, comprising the steps: interconnecting a first end of a substrate to a base; moving one of the base and a deposition device in a first direction; depositing a layer of a material on the substrate with the deposition device; pulling a second end of the substrate in a second direction; and evaluating the layer of material deposited on the substrate for hot cracking.

12. The method of claim 11 comprising the additional step of heating the substrate prior to the step of depositing the layer of material on the substrate.

13. The method of claim 11 wherein the deposition device includes:
 a dispenser configured to dispense a powder a selected rate, the powder having a particle size; and
 an energy beam generator configured to generate an energy beam having an adjustable power density, the energy beam being directable at the powder to melt the powder and form the material.

14. The method of claim 13 wherein:
 the substrate is a first substrate;
 the one of the base and the deposition device is moved in the first direction at a velocity;
 after the layer of material is deposited on the first substrate, conducting the additional steps of:
  disconnecting the first end of the first substrate from the base;
  interconnecting a first end of a second substrate to the base;
  moving at least one of the base and a deposition device in the first direction;
  depositing a layer of the material on the second substrate; and
  pulling a second end of the second substrate in the second direction;
 wherein after the layer of material is deposited on the first substrate, varying at least one of the velocity at which the one of the base and the deposition device is moved, a velocity at which the second end of the substrate in pulled in the second direction; a force with which the second end of the second substrate in pulled in the second direction, the selected rate at which the powder is dispensed, the particle size of the powder, and the power density of the energy beam, for the second substrate.

15. The method of claim 14 comprising the additional step of evaluating the layer of material deposited on the second substrate for hot cracks.

16. The method of claim 14 comprising the additional steps of:
comparing the layers of material deposited on the first and second of substrates; and
determining a preferable additive manufacturing process in response to the comparison of the layers of material deposited on the first and second substrates.

17. The method of claim 13 wherein the selected rate at which the powder is dispensed, the particle size of the powder, and the power density of the energy beam is varied as the layer of the material is deposited on the substrate.

18. The method of claim 11 wherein at least one of a velocity at which the one of the base and the deposition device is moved, a velocity at which the second end of the substrate is pulled in the second direction; and a force with which the second end of the substrate is pulled in the second direction is varied as the layer of the material is deposited on the substrate.

19. The method of claim 11 wherein the first direction and the second direction are the same.

20. A method for evaluating the susceptibility of hot cracking in an additive manufacturing process, comprising the steps: providing a substrate; interconnecting a first end of the substrate to a base; moving one of the base and a deposition device in a first direction at a velocity; dispensing a powder at a selected rate; generating an energy beam having an adjustable power density, the energy beam being directable at the powder to melt the powder and form a material; depositing a layer of the material on the substrate; pulling a second end of the substrate in a second direction; and evaluating the layer of material deposited on the substrate for hot cracking.

21. The method of claim 20 comprising the additional step of heating the substrate prior to the step of depositing the layer of material on the substrate.

22. The method of claim 20 wherein the substrate is one of a plurality of substrates and wherein the method further comprises:
for each additional substrate of the plurality of substrates, repeating the steps of:
interconnecting a first end of the additional substrate to a base;
moving one of the base and the deposition device in the first direction at the velocity;
dispensing the powder at the selected rate;
directing the energy beam at the powder to melt the powder and form the material;
depositing a layer of the material on the additional substrate;
pulling a second end of the substrate in a second direction; and
varying at least one of the velocity at which the at least one of the base and the deposition device is moved, a velocity at which the second end of the additional substrate in pulled in the second direction, a force with which the second end of the additional substrate in pulled in the second direction, the selected rate at which the powder is dispensed, a particle size of the powder, and the power density of the energy beam.

23. The method of claim 22 comprising the additional steps of:
comparing the layers of material deposited on the plurality of substrates; and
determining a preferable additive manufacturing process in response to the comparison of the layers of material deposited on the plurality of substrates.

24. The method of claim 20 wherein at least one of the velocity at which the one of the base and the deposition device is moved, a velocity at which the second end of the substrate is pulled in the second direction, a force with which the second end of the substrate is pulled in the second direction, the selected rate at which the powder is dispensed, the particle size of the powder, and the power density of the energy beam is varied as the layer of the material is deposited on the substrate.

25. The method of claim 20 wherein the first direction and the second direction are the same.

* * * * *